United States Patent [19]
Kitoh et al.

[11] Patent Number: 5,402,364
[45] Date of Patent: Mar. 28, 1995

[54] THREE DIMENSIONAL MEASURING APPARATUS

[75] Inventors: Hiroyuki Kitoh, Nagoya; Masatoshi Ohshima, Aichi, both of Japan

[73] Assignee: Sanyo Machine Works, Ltd., Aichi, Japan

[21] Appl. No.: 5,128

[22] Filed: Jan. 15, 1993

[51] Int. Cl.6 .............................................. G01B 11/02
[52] U.S. Cl. ..................................... 364/560; 364/507
[58] Field of Search ................................ 364/560, 507;
250/578.1, 227.29, 227.28, 227.26, 208.1, 206.2, 206.1

[56] References Cited

U.S. PATENT DOCUMENTS

| | | | |
|---|---|---|---|
| 4,937,766 | 6/1990 | Deppe et al. | 364/560 |
| 4,939,380 | 7/1990 | Berger et al. | 250/578.1 |
| 5,109,236 | 4/1992 | Watanabe et al. | 250/227.28 |
| 5,177,349 | 1/1993 | Setani | 250/208.1 |

Primary Examiner—Jack B. Harvey
Assistant Examiner—Thomas Peeso
Attorney, Agent, or Firm—Nikaido, Marmelstein, Murray & Oram

[57] ABSTRACT

A three-dimensional measuring apparatus includes a minimum of a pair of CCD cameras which respectively pick up an image of an objective surface of an objective workpiece requiring dimensional measurement. At least a single unit or a pair of laser scanner sequentially irradiates a plurality of spots on the measurable surface with laser beams. The spots respectively make up measuring points when operating the pair of CCD cameras for measuring dimensions of the objective surface. The laser scanner directly displays the results of the dimensional measurement on the objective surface. An image processing unit computes actual dimensions of the objective surface based on image data received from the pair of CCD cameras which computer system initially makes a comparison between dimensional data of the measured surface received from the image processing unit and basic data of the objective surface previously prepared in the course of designing the objective product, and then figures out a specific domain of the measured objective surface that has actually incurred error from the manufacturing process.

1 Claim, 2 Drawing Sheets

THREE DIMENSIONAL MEASURING APPARATUS

BACKGROUND OF THE INVENTION

1. Field of the Invention

The present invention relates to a three dimensional measuring apparatus which measures the shape of a press mold, manufactured by applying CAD/CAM methods, by means of a pair of CCD cameras and a laser scanner for example.

2. Background of the Invention

For example, any of the conventional press molds, needed for manufacturing automotive bodies, is manufactured by executing sequential processes including the following: Initially, based on data from processes for designing body style, body structure, and press mold, the design staff prepare a variety of numerically controllable data needed for manufacturing press molds by operating NC machine tools. Next, prepared numerically controlled data are stored in NC machine tools before eventually producing the predetermined press molds by operating the NC machine tools.

Next, each press mold, formed by the NC machine tools, is delivered to a finish-up process, where actual dimensions of the formed press mold are measured by operating a measuring apparatus. In order that the measured value can correctly match the predetermined design value, using a grindstone and a sandpaper, an operator manually grinds the surface of the formed press mold to complete the whole manufacturing processes.

Nevertheless, according to the existing method of manufacturing press molds described above, in particular, on the way of finally finishing up each press mold, the operator needs to mount an unfinished press mold on a measuring apparatus at the measuring position. Next, the operator measures actual of the unfinished press mold, and then again sets it to a predetermined finish-up position before eventually finishing up the processed press mold by referring to the measured values.

Nevertheless, the result of the measurement yielded from the existing measuring apparatus is not directly shown on the mounted press mold, but instead, the measured values are displayed on a CRT for example. Therefore, the operator can merely identify a faulty location of the mounted press mold containing an error solely by monitoring the CRT display before eventually finishing up the processed press mold. In other words, potential error can be generated from the final finish-up process.

Furthermore, the operator cannot measure the actual dimensions of the processed press mold while executing the final finishing process by applying any conventional measuring apparatus. Therefore, after completing the final finishing process, the operator needs to again mount the finished press mold on the measuring apparatus to check and confirm whether the finishing process has correctly been executed, or not. In consequence, while the final finishing process is underway, the operator needs to reciprocate the processed press mold between the measuring position and the finishing position several times, thus extremely complicating the final finishing process.

SUMMARY OF THE INVENTION

Therefore, the invention has been achieved to fully solve those technical problems inherent in any of those conventional dimension measuring apparatuses. The object of the invention is to provide a novel three-dimension measuring apparatus characteristically comprising the following;

a minimum of a pair of CCD cameras which respectively pick up an image of an objective measurable surface of an objective product requiring dimensional measurement;

at least a single or a pair of laser scanner(s) which sequentially irradiates a number of laser receptive spots on the above-identified measurable surface with a laser beam, wherein those laser spots respectively make up measuring points while operating the above-identified pair of CCD cameras for measuring dimensions of the objective surface, and wherein the laser scanner directly displays the result of the dimensional measurement on the measured surface;

an image processing unit which computes actual dimension of the measured surface based on image data received from the above-identified CCD cameras; and a computer system which initially makes a comparison between dimensional data of the measured surface received from the above-identified image processing unit and basic data of the measurable objective surface previously prepared in the course of designing the objective product, and then figures out a specific domain of the measured surface that has actually incurred error from the manufacturing process.

The novel three-dimensional measuring apparatus embodied by the invention initially irradiates those laser spots on the measurable surface with a laser beam, and then picks up an image of the irradiated surface by operating a pair of CCD cameras. Next, the three-dimensional measuring apparatus measures dimensions of the measured surface of the processed product which is substantially a press mold for example. Simultaneously, the apparatus activates operation of at least a unit of a laser scanner in order to directly display the measured result on the measured surface, thus enabling the dimensional measuring apparatus to correctly measure the dimensions of the objective surface in the intangible condition. In consequence, the novel three-dimensional measuring apparatus embodied by the invention enables factory operators to effectively execute dimensional measurement and finish-up operation against the objective surface at an identical operating position.

In summary, the three-dimensional measuring apparatus embodied by the invention enables factory operators to precisely measure dimensions of the measurable objective surface in the intangible condition by sequentially executing those steps including the following; a step of irradiating predetermined laser spots on the measurable surface with laser beam emitted from a laser scanner; a step of measuring dimensions of the objective measurable surface by picking up an image of the irradiated domain of the objective surface by means of a pair of CCD cameras; and a final step of directly displaying the result of the dimensional measurement on the measured surface by means of a laser scanner.

Therefore, after completing a mechanical process for manufacturing a press mold, when measuring the dimensions of the processed press mold by operating the three-dimensional measuring apparatus embodied by the invention, operators can alternately repeat the dimensional measurement and the finishing process at a predetermined dimensional measuring position. In consequence, operators are freed from reciprocating the processed press mold between the dimensional measuring position and the finishing position While engaging in the final finishing process, thus sharply promoting operating efficiency.

Furthermore, since the three-dimensional measuring apparatus embodied by the invention directly displays the measured result on the measured surface by means of a laser scanner, there is no fear of generating discrepancy in the position of executing the final finishing process while executing this eventual process. Therefore, the three-dimensional measuring apparatus embodied by the invention enables factory operators to securely achieve extremely precise effect of the finishing process.

The above and further objects and advantageous features of the invention will more fully be understood from the following detailed description in reference to the accompanying drawings that follow,

DESCRIPTION OF THE PREFERRED EMBODIMENTS

Figure 1:
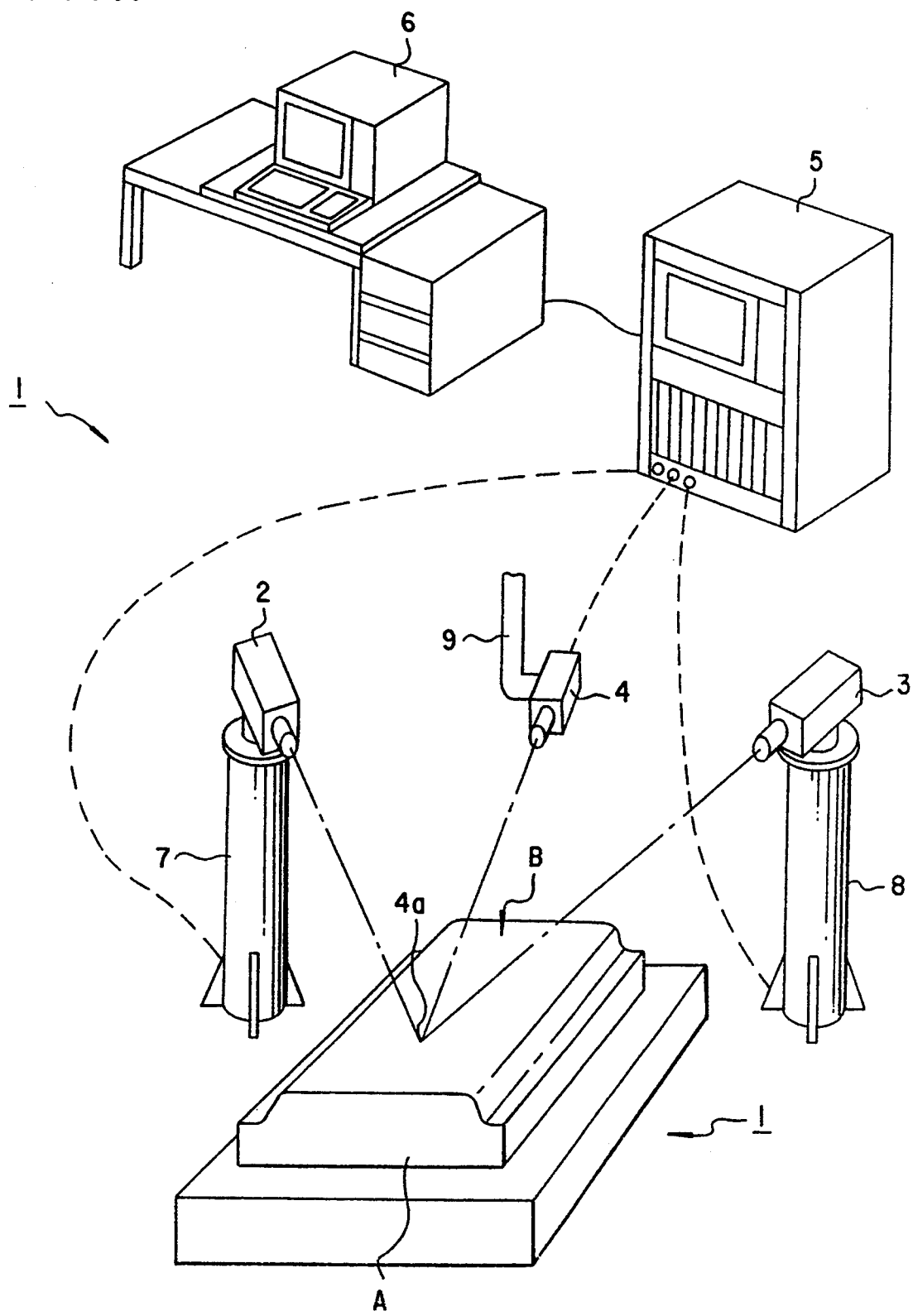
FIG. 1 schematically illustrates an overall perspective view of the three-dimensional measuring apparatus according to an embodiment of the invention.

FIG. 1 schematically illustrates an overall perspective view of the three-dimensional measuring apparatus 1 according to an embodiment of the invention, Characteristically, the three-dimensional measuring apparatus 1 mainly comprises the following; a first CCD camera 2 and a second CCD camera 3 which respectively pick up image of an objective surface B (subject to measurement of dimension) of a press mold A; a laser scanner 4 which sequentially irradiates laser spots 4a on the measurable objective surface B with a laser beam, wherein those laser spots 4a respectively make up measuring points in the dimensional measuring process, and wherein the laser scanner 4 directly displays the result of the dimensional measurement on the measured surface B of the pressed mold A; an image processing unit 5 which controls operation of the first and second CCD cameras 2 and 3 and the laser scanner 4, and also, determines the actual domain of the measured surface B based on those image data received from the first and second CCD cameras 2 and 3; and a computer system 6 which initially makes a comparison between the dimensional data of the measured surface B received from the image processing unit 5 and the basic dimensional data of the designed press mold A previously prepared in the stage of designing the press mold A, and then determines the specific location of the measured surface B that has actually incurred error from the manufacturing process.

The first and second CCD cameras 2 and 3 are respectively secured to the top of poles 7 and 8 erected on both sides of a predetermined measuring point "a" on which a press mold A is mounted. The first and second CCD cameras 2 and 3 are respectively oriented in the directions of accommodating the whole of the measurable objective surface B in the individual frame of those first and second CCD cameras 2 and 3.

The laser scanner 4 is secured to an arm 9 which is installed between the first and second CCD cameras 2 and 3. The laser scanner 4 irradiates the measurable surface B with laser beam 4a which sequentially shifts over the surface B in accordance with the predetermined locus in order to fully scan the measurable surface B.

The image processing unit 5 measures the dimensions of the measurable surface B by way of executing those sequential processes including the following: Initially, the laser scanner 4 irradiates the predetermined spots of the measurable surface B with laser beam 4a. Next, the image processing unit 5 computes a tilted angle of the laser beam 4a spotted on the frame of the first CCD camera 2 in the horizontal and vertical directions against the light axis of the first CCD camera 2. Next, the image processing unit 5 computes a tilted angle of the laser beam 4a spotted on the frame of the second CCD camera 3 in the horizontal and vertical directions against the light axis of the second CCD camera 3. Next, the computer system 6 determines the spotted position of the laser beam 4a by referring to those four kinds of data described above, actual positions of the first and second CCD cameras 2 and 3, and the direction of light axes of these first and second CCD cameras 2 and 3. Thenceforth, whenever the spotted laser beam 4a shifts over the measurable surface B, the computer system 6 repeats those mathematical operations described above. The computer system 6 eventually identifies the overall dimensions of the measurable surface B after sequentially determining positions of all the spots irradiated by the laser beam 4a, thus completing the whole process predetermined for measuring dimensions of the objective measurable surface B.

Figure 2:
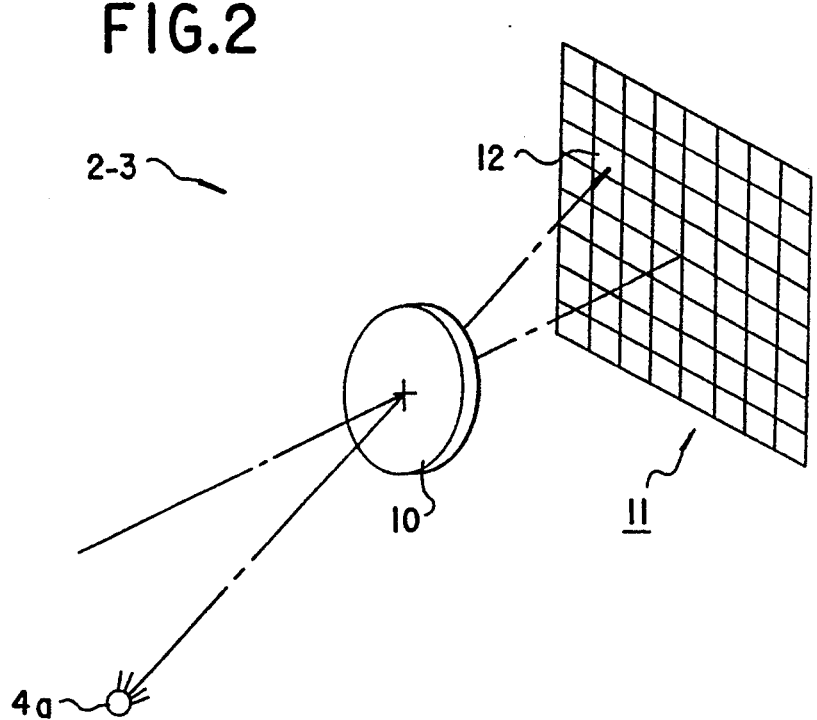
FIG. 2 schematically illustrates a perspective view designating the state in which laser beam is incident upon a CCD camera provided for the apparatus embodied by the invention.

In order that the first and second CCD cameras 2 and 3 can correctly detect the irradiating angle of the laser beam 4a, as shown in FIG. 2, when the spot laser beam 4a is incident upon a solid sensor unit 11, the first and second CCD cameras 2 and 3 respectively detect specific points from the center of the solid sensor unit 11 corresponding to those specific picture elements 12 each having highest output capacity among a large number of picture elements 12 integrally making up the solid sensor unit 11. Based on this position data, the computer system 6 computes the angle of the spotted laser beam 4a.

Figure 3:
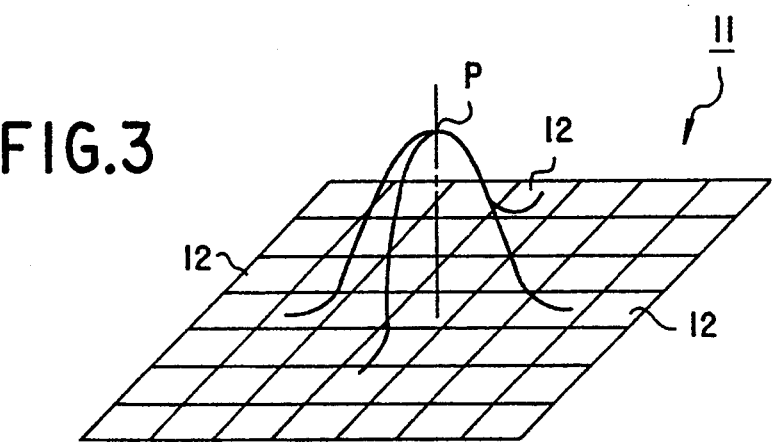
FIG. 3 schematically illustrates a perspective view which is explanatory of the method of detecting specific domain containing the highest luminance in picture elements.

When embodying the invention, in order to correctly measure the dimensions of the objective surface B, such an extremely high precision specifying a maximum of 0.1 mm of. permissible error is required. Therefore, whenever the spotted angle of the laser beam 4a is detected, extremely high precision is essential for the performance of the first and second CCD cameras 2 and 3. To achieve high precision performance, the solid sensor units 11 provided for the first and second CCD cameras 2 and 3 respectively incorporate an extremely large number of picture elements such as 1000×1000 for example. Furthermore, when detecting the angle of the spotted laser beam 4a, the first and second CCD cameras 2 and 3 do not respectively detect the angle of the spotted laser beam 4a based on such a knowledge which one of those picture elements 12 of the corresponding solid sensor unit 1 actually outputs the highest level signal, but instead, as shown in FIG. 3, the image processing unit 5 determines an output curve corresponding to the distribution of the level of luminance signal output from respective picuture elements 12. Next, by referring to the position P having the maximum value in the output curve, the image processing unit 5 detects the position which actually makes up the core of high output among those picture elements 12 each having the maximum output value. In consequence, the three dimensional measuring apparatus embodied by the invention securely guarantees high-precision performance with a maximum of 0.1 mm of permissible error component by way of correctly detecting the angle of the spotted laser beam 4a.

In this way, the image processing unit 5 correctly provides dimensional data of the objective surface B before transmitting these data to the computer system 6. The computer system 6 previously stores basic dimensional data prepared during the design of the planned press mold via the CAD and CAM methods. The computer system 6 makes a comparison between the basic dimensional data and the actually measured dimensional data before identifying any error generated on a specific domain of the measured surface B.

Next, all the data related to the dimensions of the measured surface B are returned to the image processing unit 5 from the computer system 6. Next, based on the returned data, the image processing unit 5 controls operation of the laser scanner 4 in order that the laser scanner 4 can directly irradiate the faulty domain of the measured surface B with the spotted laser beam 4a before displaying the result of the dimensional measurement on the measured surface B.

Next, the operator mounts the mechanically processed press mold A on the measuring position (a) of the three-dimensional measuring apparatus 1, and then activates the laser scanner 4 to scan the measured surface B of the mounted press mold A by spotting the laser beam 4a. This permits the three-dimensional measuring apparatus 1 to correctly measure dimensions of the objective surface B and detect errors against the previously designed values. Characteristically, the three-dimensional measuring apparatus 1 directly displays the actually measured data on the measured surface B by way of the spotting laser beam 4a.

Therefore, the operator can continuously follow up dimensional measurement and finishing process against the objective surface B at the identical location by executing the finishing process at a specific position of the objective surface B under irradiation with the spotted laser beam 4a. Thenceforth, the operator can alternately repeat the dimensional measuring and subsequent finishing processes against the objective surface B until error components are fully eliminated. This securely promotes operating efficiency.

Figure 4:
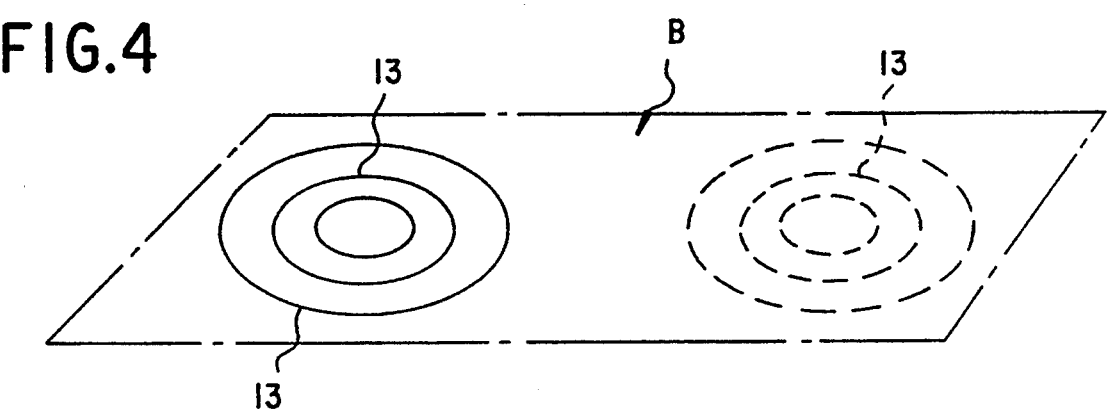
FIG. 4 schematically illustrates a perspective view which is explanatory of the method of displaying error generated from manufacturing process.

When embodying the invention, in particular, in order to display error components by spotting the laser beam 4a, the three-dimensional measuring apparatus 1 not only irradiates the measured surface B with the spotted laser beam 4a, but, as shown in FIG. 4, the scope of the invention also permits the apparatus 1 to display a specific domain of the measured surface B that actually incurs error and the amount of error by way of displaying contour lines 13 on the measured surface B by irradiating the surface B with the spotted laser beam 4a. If there were positive error components, then, the contour lines 13 may be displayed by means of solid lines. Conversely, if the error components were negative, then, the contour lines 13 may be displayed by means of broken lines.

The above description has referred to a typical case in which an identical laser scanner 4 is made available for irradiating the objective surface B with the spotted laser beam 4a as well as for displaying the erroneous domain on the objective surface B. Nevertheless, the scope of the invention also permits introduction of a pair of laser scanners 4 and 4 which are independently available for the dimensional measurement and the display of the measured results by way of irradiating the objective surface B with the spotted laser beam 4B containing a specific wavelength compatible with objects.

The scope of the invention further permits introduction of another method of displaying error components on the measured surface B by way of previously coating the objective surface B with thermosenstive paint or photosensitive paint, and then, after measuring dimension of the objective surface B, the operator activates a laser scanner 4 to irradiate the erroneous. domain with the spotted laser beam 4a to vary the shade of the previously coated thermosensitive or photosensitive paint to mark off the error-generated position.

The above description has solely referred to an embodiment of the invention by way of processing the press mold A. Nevertheless, it should be understood that the scope of the invention is also effectively applicable to any measurable objects other than the press mold A as well.

What is claimed:

1. A three-dimensional measuring apparatus comprising:

a minimum of a pair of CCD cameras which respectively pick up an image of an objective surface of an objective workpiece requiring dimensional measurement;

at least a single unit or a pair of laser scanner(s) which sequentially irradiates a plurality of spots on said objective surface with a laser beam, wherein said spots respectively make up measuring points when operating said pair of CCD cameras for measuring dimensions of said objective surface, and wherein said laser scanner directly irradiates on said objective surface a specific domain of said objective surface that has actually incurred error from a manufacturing process;

an image processing unit which computes actual dimensions of said objective surface based on image data received from said pair of CCD cameras; and a computer system which initially makes a comparison between dimensional data of said objective surface received from said image processing unit and basic data of said objective surface previously prepared during design of said objective workpiece, and then determines said specific domain of said objective surface that has actually incurred error from said manufacturing process.

* * * * *